US008058605B2

(12) United States Patent
Scheiber et al.

(10) Patent No.: US 8,058,605 B2
(45) Date of Patent: Nov. 15, 2011

(54) OPTOELECTRONIC SENSOR FOR SAFEGUARDING A HAZARDOUS AREA

(75) Inventors: Rudolf Scheiber, Sargans (CH); Thomas Luisoni, Chur (CH); Wolfgang Bux, Malans (CH); Kurt Brandauer, Malenfeld (CH)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 12/617,797

(22) Filed: Nov. 13, 2009

(65) Prior Publication Data

US 2010/0127158 A1   May 27, 2010

Related U.S. Application Data

(63) Continuation of application No. PCT/EP2008/003858, filed on May 14, 2008.

(30) Foreign Application Priority Data

May 15, 2007   (DE) .......................... 10 2007 024 210

(51) Int. Cl.
*G06M 7/00* (2006.01)
*F16P 3/14* (2006.01)
(52) U.S. Cl. ..................................... 250/221; 250/208.4
(58) Field of Classification Search .................. 340/556, 340/508, 506, 540, 541, 545.3, 555, 557, 340/573.1, 599; 361/186, 170, 173–177; 250/222.1, 208.4, 221, 214 R, 214.1, 206
See application file for complete search history.

(56) References Cited

U.S. PATENT DOCUMENTS

| 3,704,396 | A |   | 11/1972 | Macdonald |
|---|---|---|---|---|
| 3,746,863 | A | * | 7/1973 | Pronovost .................. 250/222.1 |
| 4,650,990 | A |   | 3/1987 | Jönsson |
| 4,818,866 | A | * | 4/1989 | Weber .......................... 250/221 |

(Continued)

FOREIGN PATENT DOCUMENTS

DE   101 20 940 A1   10/2002

(Continued)

OTHER PUBLICATIONS

DIN EN 954-1; Safety-related parts of control systems; Dec. 1996; 34 pages.

(Continued)

*Primary Examiner* — Que T Le
*Assistant Examiner* — Jennifer Bennett
(74) *Attorney, Agent, or Firm* — Harness, Dickey & Pierce, P.L.C.

(57) ABSTRACT

An optoelectronic sensor for safeguarding a hazardous area, such as a light grid, has a first and a second sensor part. The two sensor parts are arranged at a spatial distance from one another. Each sensor part has a plurality of transmitting elements for generating transmitted beams and a plurality of receiving elements for receiving the transmitted beams. In this way, a plurality of transmitted beams in opposite directions are formed between the sensor parts. Each sensor part has at least one evaluation circuit, which is coupled to the receiving elements of the respective sensor part. Each evaluation circuit is designed to generate a switch-off signal in a manner dependent on the respectively coupled receiving elements. In a preferred configuration, each sensor part has a plurality of evaluation circuits which are coupled to one another to form a series arrangement of evaluation circuits, and which are additionally coupled to a common data bus connection.

9 Claims, 3 Drawing Sheets

U.S. PATENT DOCUMENTS

| | | | |
|---|---|---|---|
| 6,166,371 A | * | 12/2000 | Milbrath et al. ............. 250/221 |
| 6,894,623 B2 | * | 5/2005 | Hama et al. ............. 340/815.54 |
| 2007/0069114 A1 | | 3/2007 | Clifton et al. |

FOREIGN PATENT DOCUMENTS

| | | | |
|---|---|---|---|
| DE | 10120940 | * | 10/2002 |
| DE | 20 2005 010 358 U1 | | 10/2005 |
| EP | 1 180 697 B1 | | 2/2002 |
| EP | 1 260 950 A2 | | 11/2002 |
| EP | 1 615 053 A1 | | 1/2006 |
| EP | 1 870 734 A1 | | 12/2007 |
| WO | WO 01/69582 A1 | | 9/2001 |

OTHER PUBLICATIONS

EN ISO 13849-1; Safety of machinery—Safety-related parts of control systems—Part 1: General principles for design; Nov. 2006; 97 pages.

* cited by examiner

OPTOELECTRONIC SENSOR FOR SAFEGUARDING A HAZARDOUS AREA

CROSS REFERENCES TO RELATED APPLICATIONS

This application is a continuation of international patent application PCT/EP2008/003858 filed on May 14, 2008 designating the U.S., which international patent application has been published in German language and claims priority from German patent application DE 10 2007 024 210.9 filed on May 15, 2007. The entire contents of these prior applications are incorporated herein by reference.

BACKGROUND OF THE INVENTION

The present invention relates to an optoelectronic sensor for safe-guarding a hazardous area, and more particularly to a light grid having a first and a second sensor part which are arranged at a spatial distance from one another, wherein a plurality of transmitted light beams in opposite directions are formed between the sensor parts.

The invention generally relates to the field of safety technology in terms of protecting persons and/or material articles of value against hazards caused by machines or installations operating in automated fashion, such as e.g. robots operating in automated fashion. One typical protective measure consists in blocking off the hazardous area of such an installation, such that entry to the hazardous area either is prevented or leads to the stopping, switching off or other alleviation of the hazardous operating situation. Mechanical protective fences or protective doors are often used for blocking off such a hazardous area. However, access to the safeguarded hazardous area is often necessary, because for instance an operator requires access to the machine and/or because material has to be transported into or out of the hazardous area. Optoelectronic protective devices, such as light barriers or light grids, are often used for such cases. Such optoelectronic sensors generate one or more transmitted beams, which are detected by one or more receiving elements. If a transmitted beam is interrupted by a body part of a person, for example, this interruption is identified by means of the receiving elements and the installation can be stopped or switched off.

For such applications, it is important that the protective function achieved by means of the optoelectronic sensor is maintained even when the sensor has a functional fault or for other reasons is unable to detect and report the intrusion of an object into the hazardous area. Therefore, sensors for such applications are subject to specific requirements that are defined in particular in the European standards EN 954-1 and EN ISO 13849-1. On account of these specific requirements, a sensor for the applications described above generally differs from optoelectronic sensors for other, non-safety-relevant applications. Even though the present invention can in principle also be used in non-safety-relevant applications, it primarily relates to an optoelectronic sensor which satisfies at least the requirements of category 3 in the abovementioned standard EN 943-1 or comparable requirements with respect to intrinsic failsafety.

Light barriers, light grids and similar sensors typically have a transmitting part, which generates the transmitted beams, and a receiving part for detecting the transmitted beams. In many cases, the transmitted beams run parallel and in the same direction from the transmitter to the receiver. However, there are also concepts with transmitted beams in opposite directions between the two sensor parts, wherein these cases usually involve reflected-light barriers where a mirror in one of the sensor parts is used to generate a returning beam in response to an outgoing transmitted beam. A reflection light grid having such beams in opposite directions is known from DE 20 2005 010 358 U1, for example. Reflection light barriers and light grids have the advantage that only one sensor part has to contain active elements, while the other sensor part can be embodied in passive fashion. Cable connections can therefore be concentrated on the one active sensor part.

EP 1 615 053 A1 discloses a light grid having a modular construction and having a plurality of transmitter and receiver modules in both sensor parts, wherein a transmitter module and receiver module from each sensor part are opposite one another in such a way that the transmitted beam from one module can be detected by the receiving element of the other module. This arrangement is proposed, in particular, in order to be able to react to external light influences in a variable manner. Depending on the location of a disturbing external light source, only those transmitted beams which run counter to the external light source are used. This rules out a situation where the receiving elements are dazzled by the external light source. As is conventional in the prior art, EP 1 615 053 A1 proposes to connect the plurality of transmitting and receiving modules from each sensor part serially to a central evaluation and control unit.

DE 101 20 940 A1 proposes an optoelectronic sensor in the form of a light curtain, wherein individual light grid modules each are connected in series to form a first and a second sensor part, respectively. As in the light grid from EP 1 615 053 A1, the two sensor parts are connected to an external evaluation and control unit. Each light grid module generates a plurality of parallel transmitted beams running in the same direction. However, the respectively adjacent light grid modules are combined in such a way that groups of transmitted beams in opposite directions result overall. What is achieved in this way according to DE 101 20 940 A1 is that the adjacent light grid modules do not optically influence one another.

The previously known concepts for such optoelectronic sensors have the disadvantage that the reaction time of the sensor generally rises linearly with the number of transmitted beams used. Therefore, a light grid or a light curtain with a large number of transmitted beams typically has a longer reaction time than a light grid having a small number of transmitted beams. The reaction time of the sensor is an important variable because it determines the distance at which the sensor has to be arranged in front of the installation to be safeguarded. A large distance requires a large constructional space, which is disadvantageous for space and cost reasons. Shorter reaction times would be possible by means of a smaller number of transmitted beams. However, this would result in a reduction of the resolution, which in unfavorable cases could have the effect that a body part can pass through the optically monitored region of the sensor without being detected.

Furthermore, the previously known concepts for optoelectronic sensors of the type mentioned above are relatively expensive if a large number of variants for different protective field heights, resolutions and/or reaction times are to be provided.

SUMMARY OF THE INVENTION

Against this background, it is an object of the present invention to provide an optoelectronic sensor of the type mentioned above which enables a very cost-effective implementation in various expansion stages.

It is another object of the invention, to provide an optoelectronic sensor of the type mentioned above which enables very short reaction times even in the case of large protective fields.

In accordance with one aspect of the present invention, there is provided an optoelectronic sensor for safeguarding a hazardous area, in particular a light grid, comprising a first and a second sensor part, which are arranged at a spatial distance from one another, wherein each sensor part has a plurality of transmitting elements for generating transmitted beams and a plurality of receiving elements for receiving the transmitted beams, such that a plurality of transmitted beams in opposite directions are formed between the sensor parts, wherein each sensor part has at least one evaluation circuit which is coupled to the receiving elements of the respective sensor part, wherein each evaluation circuit is designed to generate a switch-off signal in a manner dependent on the respectively coupled receiving elements.

In accordance with another aspect, there is provided a light grid arrangement for safeguarding a hazardous area, comprising a first and a second sensor part arranged at a spatial distance from one another, each sensor part having a plurality of transmitting elements for generating transmitted beams and a plurality of receiving elements for receiving the transmitted beams, such that a plurality of transmitted beams in opposite directions are formed between the sensor parts, and each sensor part having a plurality of evaluation circuits coupled to the receiving elements of the respective sensor part, with each evaluation circuit being designed to generate a switch-off signal in a manner dependent on the respectively coupled receiving elements, and a control unit coupled to the evaluation circuits, the control unit being configured to generate a redundant enable signal as a function of the switch-off signals, wherein a first evaluation circuit in each sensor part is coupled to a first number of the receiving elements, wherein a further evaluation circuit in each sensor part is coupled to a different number of the receiving elements, wherein the first and the further evaluation circuit in each sensor part are coupled to one another via a first line connection in order to form a series arrangement of evaluation circuits, wherein the series arrangement has an output coupled to the control unit in order to transmit the switch-off signals to the control unit in a manner dependent on all the receiving elements coupled to the series arrangement, and wherein the plurality of evaluation circuits in each sensor part are further connected to a common data bus connection, which is also connected to the control unit.

Accordingly, the novel sensor uses a plurality of evaluation circuits for the evaluation of the receiving elements, wherein at least one evaluation circuit is arranged in each sensor part. Each evaluation circuit is coupled to a plurality of receiving elements of the respective sensor part. One exemplary embodiment currently provides for each evaluation circuit to evaluate five or six receiving elements. In principle, however, it is also possible for a larger or smaller number of receiving elements to be coupled to each evaluation circuit.

The receiving elements are coupled to the respective evaluation circuit in groups and in parallel. This enables a faster reaction time than in the case of conventional concepts where all the receiving elements are evaluated temporally successive fashion. The reaction time is shortened here because one or a plurality of evaluation circuits are used in each sensor part and the plurality of evaluation circuits can operate in parallel with one another.

Furthermore, the use of transmitted beams in opposite directions in conjunction with the evaluation circuits in the two sensor parts enables a modular construction, which allows the two sensor parts to be realized almost or even completely identically. Possible differences can be limited to a few features, which can even be realized in the software such as, for instance, the possibility of configuring one of the sensor parts as a master and the other sensor part as a slave. Such a configuration facilitates synchronization of the two sensor parts, with the two sensor parts, for the rest, being constructed identically. The substantial identity of the modules enables cost-effective production and stocktaking as a result of increased numbers and flexible use possibilities.

In a preferred refinement, the at least one evaluation circuit in each sensor part is furthermore coupled to the transmitting elements of the respective sensor part in order to control the emission of the transmitted beams.

In this refinement, the at least one evaluation circuit in each sensor part is strictly speaking not only an evaluation circuit but also a control circuit. The configuration has the advantage that each sensor part can operate autonomously. This simplifies the advantageous identity of the sensor parts and contributes to a further reduction of the production and storage costs.

In a further refinement, each sensor part is designed to generate modulated transmitted beams, wherein the modulated transmitted beams form an optical communication link for synchronization between the sensor parts.

In one advantageous exemplary embodiment, the transmitted beams each are emitted with a pulse code modulation. Alternatively or in addition, other digital or analogue modulation methods can also be employed, in principle. The use of modulated transmitted beams enables very simple and fast synchronization of the sensor parts. Moreover, in preferred exemplary embodiments, the optical communication link can be used to exchange information between the evaluation circuits in the opposite sensor parts. This can advantageously be used to adaptively match the sensor parts to one another. Furthermore, by means of the modulated transmitted beams, light reflections, extraneous light sources and other disturbances from the environment can be distinguished from the transmitted beams, which reduces the probability of erroneous detections and detection gaps owing to "blindness".

In a further refinement, each sensor part has an even number of transmitting elements and an even number of receiving elements, the transmitting elements and the receiving elements being alternately arranged alongside one another, wherein each receiving element faces exactly one transmitting element.

In this refinement, each sensor part has an even number of transmitting and receiving elements alternately arranged alongside one another (individually or in groups) having the same number of elements. In one preferred exemplary embodiment, each receiving element lies between two adjacent transmitting elements, and vice versa, apart from the first and last elements in the series, which each have only one neighbor. In other exemplary embodiments, however, two or more transmitting elements can alternate with two or more receiving elements (the same number in each case). The refinement has the advantage that it is possible to use identical modules in the two sensor parts, by mounting one of the modules "upside down". In this way, each transmitting element has a receiving element opposite it, and vice versa, and only a single type of module has to be produced.

In a further refinement, the optoelectronic sensor has at least one control unit coupled to the evaluation circuits, wherein the control unit generates a redundant enable signal in a manner dependent on the switch-off signal.

In this refinement, the evaluation circuits primarily serve to evaluate the receiving elements and, if appropriate, to drive the transmitting elements. An enable signal (typically referred to as an OSSD signal) that satisfies the requirements for safety-relevant applications is generated by means of the control unit, by contrast. This distribution of responsibilities allows the evaluation circuits to be realized very simply and cost-effectively, which is advantageous in the case of light grids and light curtains having a large number of transmitted beams. In preferred exemplary embodiments, the control unit has a plurality of external connections, such as, for example, for a reset or start pushbutton, the setting of operating modes, the connection of signaling devices with contacts, such as emergency off pushbuttons or protective doors, the connection of muting sensors and/or muting lamps or as a diagnostic interface.

In a further refinement, the control unit has a first and a second channel, wherein the first channel is arranged in the first sensor part, and wherein the second channel is arranged in the second sensor part. In preferred exemplary embodiments, the sensor additionally has a communication connection between the two channels of the control unit. The communication connection can be realized in a wireless manner by means of radio or infrared, or as a cable connection.

This refinement allows a very simple and cost-effective construction because the two sensor parts including the control unit can be realized substantially identically. Furthermore, a control unit arranged in the sensor parts simplifies the installation outlay on the machine to be safeguarded. Moreover, distributing the channels between the two separate sensor parts contributes to reducing the probability of simultaneous faults in the channels of the control unit.

In a further refinement, the control unit is arranged separately from the first and the second sensor part.

In this refinement, the control unit is realized in a manner spatially separated from the sensor parts as an external control unit for the two sensor parts. This configuration is advantageous for "intelligent" sensors having numerous connection possibilities and/or comprehensive evaluation properties, because the control unit in this case is not limited to the small structural space within the sensor parts. In one preferred exemplary embodiment that can readily be realized in this configuration, the control unit is designed to classify and/or identify objects that pass through the protective field on the basis of the temporal sequence and duration of the individual beam interruptions. Thus, even three-dimensional object recognition is possible.

In a further refinement, each sensor part has a plurality of evaluation circuits, wherein a first evaluation circuit is coupled to a first number of the receiving elements, and wherein a further evaluation circuit is coupled to a further number of the receiving elements.

In this refinement, each sensor part has a plurality of—preferably identical—transmitting/receiving modules, wherein each module generates and evaluates a plurality of transmitted beams. With this configuration, sensors with large protective fields can be realized in a very cost-effective manner.

In a further refinement, the first and the further evaluation circuit in each sensor part are coupled to one another via a first line connection in order to form a series arrangement of evaluation circuits, wherein the series arrangement has an output, at which the switch-off signal is provided in a manner dependent on all the receiving elements which are coupled to the series arrangement.

The series arrangement provides a combined (common) switch-off signal in a manner dependent on all the receiving elements which are coupled to the series arrangement. In other words, the series arrangement generates a logical OR between the switch-off signals from the coupled evaluation circuits. Even if a switch-off signal is present only from one evaluation circuit, the common switch-off signal is generated (logical OR). This configuration allows a very simple, cost-effective and fast "combination" of the results from the individual evaluation circuits.

In one preferred exemplary embodiment, the evaluation circuits in each sensor part are coupled to one another in such a way that an output of a first evaluation circuit is connected to an input of a subsequent evaluation circuit. In this case, an enable signal, for example a 24 Volt signal or a defined clock signal, is communicated serially from one evaluation circuit of the series arrangement to the next. During operation, an omission of the respectively forwarded enable signal represents the common switch-off signal of all preceding evaluation circuits. With such a series arrangement, the time-critical switch-off information (in the form of the enable signal, that is to say with inverted logic) can be transmitted very rapidly to the control unit. Furthermore, such a series arrangement allows a simple configuration of the sensor parts after switch-on. This is because the actual number of evaluation circuits present is advantageously determined automatically by a counting word being forwarded from one evaluation circuit of the series arrangement to the next and being incremented in the process. In one particularly preferred exemplary embodiment, automatic address allocation to the evaluation circuits is additionally effected in a manner dependent on the respective status of the counting word. In other preferred exemplary embodiments, the series arrangement can be realized by the evaluation circuits of a sensor part being connected to a common enable line, which can be pulled to a defined potential, such as a ground potential, by each evaluation circuit ("wired OR"). Only if no evaluation circuit pulls the potential on the common enable line to the defined potential, the enable line can carry a defined enable signal. In this case, too, the enable signal represents the time-critical switch-off information in inverted logic. The time-critical switch-off information can thus be transmitted to a control unit particularly simply and rapidly. The advantageous possibility of automatically counting the evaluation circuits present on the basis of the series arrangement is omitted in this case, however.

In a further configuration, the plurality of evaluation circuits are connected to a common bus data connection, which is connected to the control unit.

This configuration is advantageous for transmitting a large number of detail information items from the individual evaluation circuits to the control unit efficiently and cost-effectively. Detail information items can contain, in particular, indications about what transmitted beams were interrupted at what point in time and for how long. On the basis of such information items, the control unit can classify an object that breaks through the transmitted beams, for example. The control unit can thus realize a blanking function, which makes it possible to transport specific objects, such as defined workpieces, through the protective field of the sensor without the installation having to be switched off. In the particularly preferred configuration, the novel sensor combines the series arrangement described above and a parallel coupling of the evaluation circuits to the common bus data connection to the control unit, in order to allow both efficient detail evaluation and a very short reaction time. Moreover, an internal diverse redundancy is thus created, which is highly advantageous with regard to the fail safety of the sensor. In one particularly preferred exemplary embodiment, the bus data connection is an I$^2$C bus with a common clock line and a common data line, on which the detail information items are transmitted clock-synchronously with the clock line.

In a further refinement, each sensor part is designed to generate the transmitted beams sequentially at least in sections.

Sequentially in sections means here that the transmitted beams in a section of the sensor are generated temporally successively and mutually exclusively. Advantageously, a section is formed by a respective transmitting-receiving module comprising an evaluation circuit, transmitting elements and receiving elements connected thereto. The sequential generation of the transmitted beams within such a section contributes to avoiding unrecognized crosstalk between the individual transmitted beams. Moreover, with this configuration, it is possible to realize a very simple and efficient communication protocol between the two sensor parts, which facilitates the synchronization of the sensor parts.

In a further refinement, each sensor part is designed to acknowledge a received transmitted beam by means of a dedicated modulated transmitted beam.

In this refinement, each sensor part transmits a transmitted beam with a modulated information item as soon as it has received a transmitted beam from the respective other sensor part. The "response beam" serves not only as a transmitted beam for monitoring the protective field, but also as an acknowledgement signal for the other sensor part. In preferred exemplary embodiments, the acknowledgement signals that the initially receiving sensor part was able to receive the modulated transmitted beam of the initially transmitting sensor part with sufficient signal strength and to demodulate it without any errors. Alternatively or in addition, the acknowledgement signal can also be a repeat request, which signals to the transmitting sensor part that the preceding transmitted beam could not be successfully demodulated or identified. This configuration advantageously contributes to increasing the error tolerance of the novel sensor and to avoiding false alarms.

In a further refinement, the transmitting elements have a variable transmission power with a power minimum and a power maximum, wherein each sensor part is designed to alter the transmission power of the transmitting elements in steps between the power minimum and the power maximum.

This refinement is very advantageous because it allows the transmission power of the individual transmitting elements to be set adaptively. In one exemplary embodiment, the transmission power of the transmitting elements is increased step by step starting from the power minimum until the receiving elements of the respective other sensor part can receive and demodulate the transmitted beams without data errors. The configuration makes it possible to dispense with expensive selection of the transmitting elements. Moreover, as a result of the optimization of the transmission power, the risk of crosstalk is reduced and the lifetime of the transmitting elements is increased. It is advantageous, moreover, if the adaptive setting of the transmission power is cyclically repeated, for example each time the sensor is switched on, because aging phenomena and/or contamination effects are compensated for in this way.

It goes without saying that the features mentioned above and those yet to be explained below can be used not only in the combination respectively specified but also in other combinations or by themselves, without departing from the scope of the present invention.

BRIEF DESCRIPTION OF THE DRAWINGS

Exemplary embodiments of the invention are illustrated in the drawing and are explained in more detail in the following description. In the figures.

DESCRIPTION OF PREFERRED EMBODIMENTS

Figure 1:
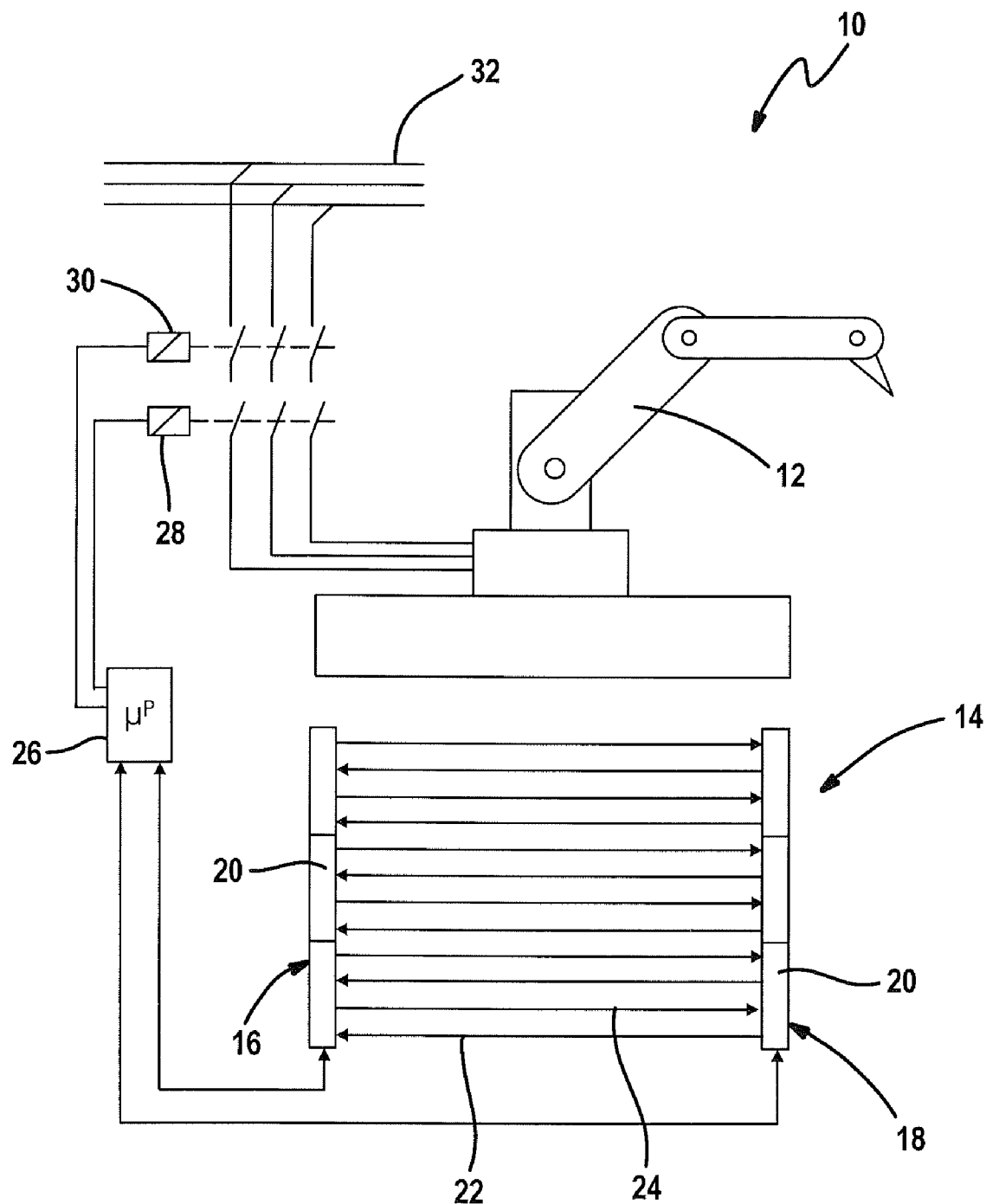
FIG. 1 shows an installation operating in automated fashion with an exemplary embodiment of the novel sensor.

In FIG. 1, an apparatus with an exemplary embodiment of the novel sensor is designated by the reference numeral 10 in its entirety. The apparatus 10 here comprises a robot 12, the movement area of which is a hazardous area for persons. This hazardous area is safeguarded here by means of the novel sensor 14.

The sensor 14 has a first sensor part 16 and a second sensor part 18, which are arranged at a spatial distance from one another. Each sensor part 16, 18 here comprises three modules 20, which are each constructed identically in the exemplary embodiment illustrated. Each module 20 generates a number of transmitted beams 22, 24 which run at least approximately parallel to one another between the two sensor parts 16, 18. The transmitted beams 22, 24 form an optically monitored protective field, by means of which the intrusion of a person or object into the hazardous area can be detected.

In accordance with one aspect of the novel sensor, the optically monitored protective field here is formed by transmitted beams 22, 24 in opposite directions, which will be explained in detail below with reference to FIGS. 2 and 3.

Reference numeral 26 designates a control unit, which here is connected to each of the two sensor parts 16, 18. In a manner dependent on the signals of the sensor parts 16, 18, the control unit 26 generates a two-channel redundant enable signal, which is used here to drive two contactors 28, 30. The contactors 28, 30 have operating contacts which are closed only when the enable signal is present (normally open). The operating contacts of the contactors 28, 30 are connected in series between an operating voltage 32 and the drives of the robot 12. Accordingly, the robot 12 can be operated only if the enable signal from the control unit 26 is present.

Figure 2:
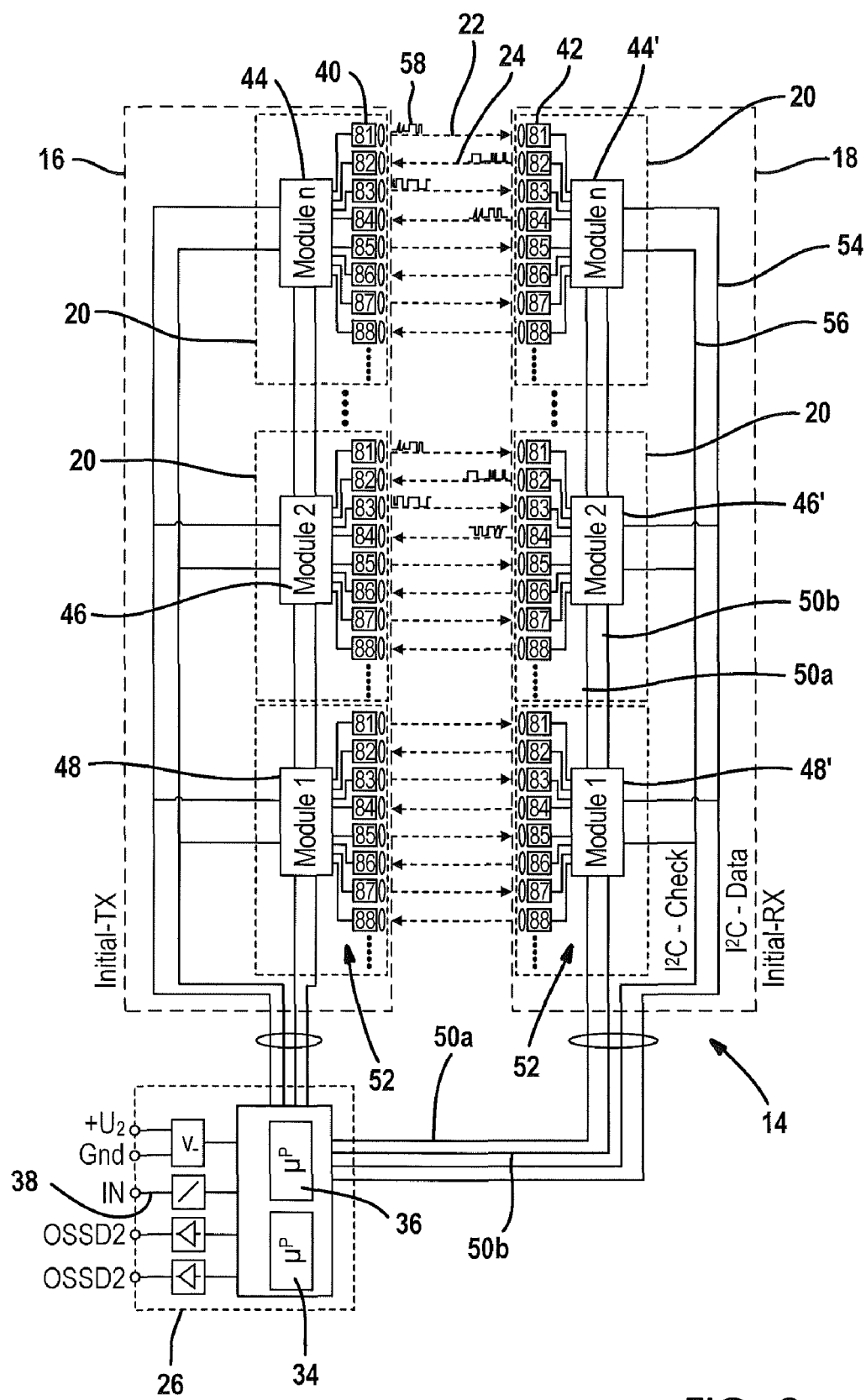
FIG. 2 shows the optical sensor from FIG. 1 in details.

FIG. 2 illustrates further details of the novel sensor 14 with the control unit 26. Identical reference symbols designate the same elements as before.

The control unit 26 here is constructed with two-channel redundancy, i.e. it has two channels, which are illustrated here in a simplified manner on the basis of two redundant microprocessors 34, 36. The two microprocessors 34, 36 process the signals from the sensor parts 16, 18 in redundant fashion with respect to another, and together they generate the two-channel enable signal at the outputs OSSD. Moreover, the control unit 26 has a number of inputs, only one input 38 of which is illustrated here for the sake of simplicity. The inputs 38 can be embodied in particular for the connection of signaling devices with contacts, such as emergency off pushbuttons or protective door switches, and for monitoring the contactors 28, 30 (External Device Monitoring, EDM). Furthermore, in one preferred exemplary embodiment, inputs for the connection of a start pushbutton, inputs for the connection of muting sensors and also a diagnostic interface may be present. In further exemplary embodiments, the inputs may additionally comprise a field bus or network connection and/or an input for configuring the operating modes of the sensor 14.

The modules 20 of the two sensor parts 16 and 18 are each constructed identically. Each module 20 has a plurality of transmitting elements and a plurality of receiving elements, only one transmitting element 40 and one receiving element 42 being designated here for reasons of clarity. Furthermore, each module 20 has an evaluation circuit 44, 46, 48, which, in preferred exemplary embodiments, is realized by means of a microcontroller, alternatively by means of an ASIC and/or FPGA. In some preferred exemplary embodiments, the evaluation circuits 44, 46, 48 are realized in two-channel fashion, i.e. each evaluation circuit 44, 46, 48 comprises redundant microcontrollers, ASICs, FPGAs or the like. Furthermore, in some exemplary embodiments, the microprocessors 34, 36 can form the function of the closest evaluation circuit 48, and in these cases the corresponding transmitting and receiving elements have to be connected to the microprocessors 34, 36.

The transmitting elements 40 and receiving elements 42 are arranged alternately alongside one another in each module 20, wherein the modules 20 of the sensor part 18 are arranged "upside down". Accordingly, each receiving element 42 in the sensor part 18 faces a transmitting element 40 in the sensor part 16, and vice versa.

In each sensor part 16, 18, the evaluation circuits 44, 46, 48 are coupled via a redundant line connection 50a, 50b to form a series arrangement 52 of evaluation circuits 44, 46, 48. In one preferred exemplary embodiment, the line connection 50a, 50b is a direct connection between corresponding inputs and outputs of the evaluation circuits, with only a binary switch-off signal (as a result of the omission of a defined enable signal), being transmitted on said direct connection. The binary switch-off signal is transmitted from the respective last evaluation circuit 48, 48' in each sensor part 16, 18 to the control unit 26. The control unit 26 generates the redundant enable signal at the outputs OSSD1 and OSSD2 in a manner dependent on the binary switch-off signals of the sensor parts 16, 18.

It is quickly clear to experts in this field that the binary switch-off signal on the serial connection 50 signals a switch-off request as soon as one or more of the transmitted beams 22, 24 between the sensor parts 16, 18 is or are interrupted. For the switch-off signal on the connection 50 it is unimportant which of the transmitted beams 22, 24 are interrupted in order to allow a fast system reaction. The reaction time of the sensor 14 is rather short even where there are a large number of transmitted beams 22, 24, because the evaluation circuits 44, 46, 48 evaluate the connected receiving elements 42 in parallel in each case.

In the exemplary embodiment illustrated, the evaluation circuits 44, 46, 48 in each sensor part 16, 18 are additionally connected to a bus connection in parallel with one another, said bus connection here comprising a data line 54 and a clock line 56. In one preferred exemplary embodiment, an I²C bus connection is involved, which allows a very cost-effective realization. In principle, however, a different bus connection could also be employed here. All the evaluation circuits 44, 46, 48 are connected to the control unit 26 via the bus connection 54, 56, with the result that the control unit 26 ultimately obtains information from the evaluation circuits 44, 46, 48 via two different communication paths. In the preferred exemplary embodiment, detail information items are transmitted to the control unit 26 via the bus connection 54, 56. In particular, via the bus connection 54, 56, the evaluation circuits 44, 46, 48 report which transmitted beams 22, 24 are interrupted at which point in time and/or in which order, whereas all that is reported via the serial connection 50a, 50b is that transmitted beams 22, 24 are interrupted. An increased failsafety, a short reaction time and a detailed evaluation of the respectively interrupted transmitted beams 22, 24 are made possible by means of the two different and mutually redundant communication connections 50a, 50b and 54, 56.

In preferred exemplary embodiments, the transmitting elements 40 in each sensor part are light emitting diodes, laser diodes or other actively luminous transmitting elements which are respectively driven by the evaluation circuits 44, 46, 48 in such a way that the transmitted beams 22, 24 are modulated, which is illustrated symbolically at the reference numeral 58. The modulation 58 of the transmitted beams 22, 24 is chosen such that the individual transmitted beams 22, 24 comprise an individual code that is demodulated and evaluated by the evaluation circuit 44, 46, 48 of the respective other sensor part. Incident extraneous light, for example on account of light reflections or incident sun light, can be distinguished from the genuine transmitted beam 22, 24 in this way. In one preferred exemplary embodiment, the transmitted beams 22, 24 are provided with a pulse code modulation, which is also used for the synchronization of the individual modules 20. In the preferred exemplary embodiment, the modules 20 are configured in such a way that the last module in the series arrangement of the modules of the first sensor part 16 is the first module to generate a transmitted beam 22 by virtue of the fact that it drives the first transmitting element 40 with the corresponding modulation code 58. The evaluation circuit 44 of the sensor part 16 then expects a transmitted beam 24 at the first receiving element 42 within a defined time period. The expected transmitted beam 24 at the receiving element 42 must comprise a defined modulation code in order that the evaluation circuit 44 identifies an error-free transmission of its own transmitted beam 22. In one preferred exemplary embodiment, the modulation code of the "response transmitted beam" 24 contains a modulation that signals an acknowledgement signal or a repeat request, the latter being transmitted whenever the evaluation circuit 44' of the second sensor part 18 cannot decode the received modulation 58 of the first sensor part 16. At a defined number of "incorrect attempts", the evaluation circuits 44, 44' in the sensor parts 16, 18 generate the switch-off signal 50a, 50b. By contrast, if the evaluation circuits 44, 44' were able to decode the respectively received transmitted beams 22, 24 without any errors, the further transmitted beams are generated sequentially successively by means of the further coupled transmitting elements. Overall, an optical communication protocol between the sensor parts 16, 18 is thus realized which serves, in particular, for the synchronization of the sensor parts 16, 18. Moreover, high reliability with respect to disturbances caused by extraneous light and/or interference is achieved by means of the acknowledgement signal.

Furthermore, in this exemplary embodiment, it is preferred for the transmission power of the active transmitting elements 40 to be iteratively adapted to an optimum transmission power by means of the optical communication protocol. In one exemplary embodiment, this is done by the first sensor part 16 initially emitting the first transmitted beam 20 with a very low transmission power (power minimum) and increasing the transmission power step by step until the "response" transmitted beam 24 of the second sensor part 18 signals error-free reception of the emitted transmitted beam 22. The transmission power of the other transmitting elements 40 in all the modules 20 is also set step by step in the same way. Alternatively, the setting of the optimum transmission power can also be effected in a manner preceding from the transmission power maximum of the individual transmitting elements 40.

Figure 3:
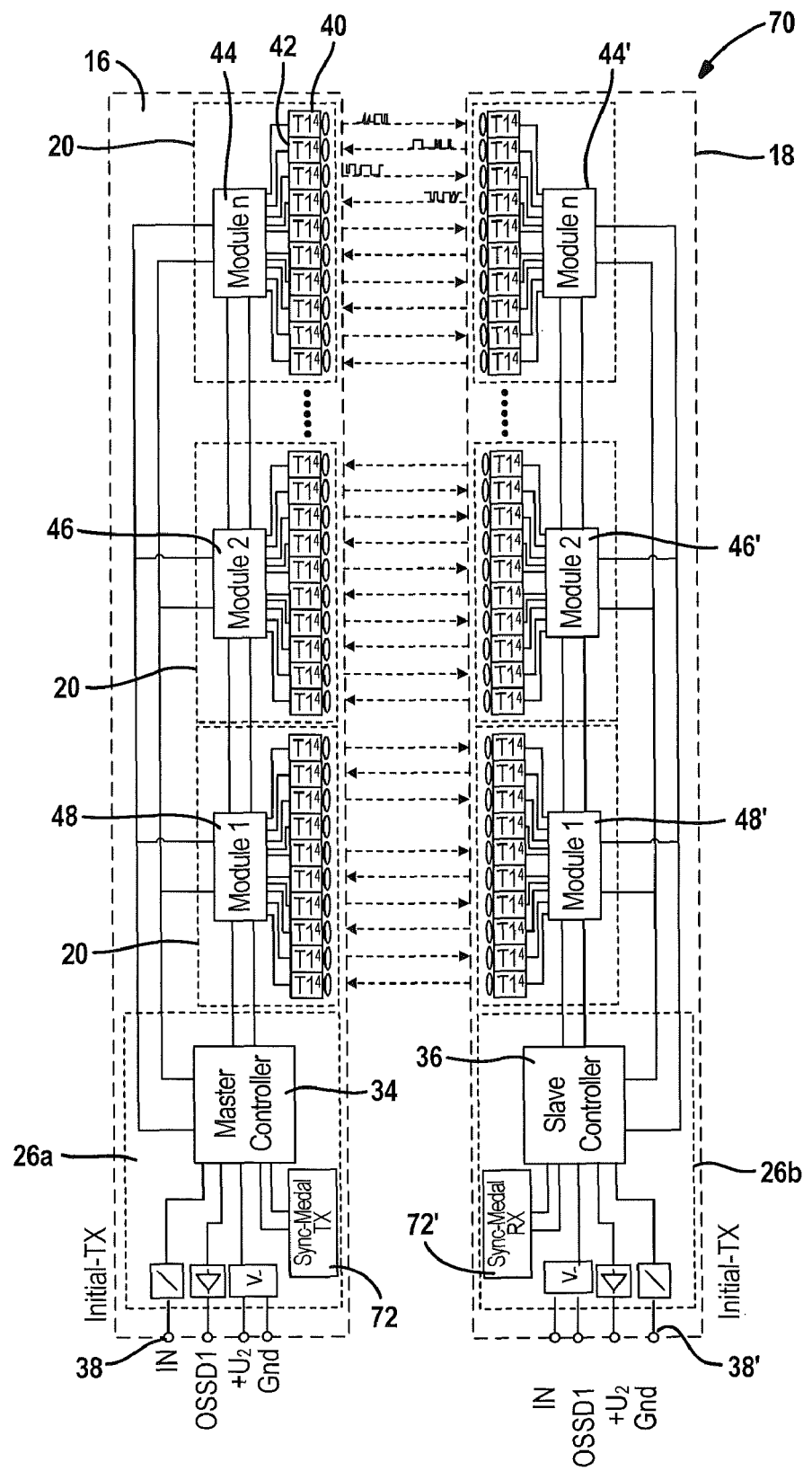
FIG. 3 shows a further exemplary embodiment of the novel optical sensor.

FIG. 3 shows a further exemplary embodiment of the novel sensor, which is designated in its entirety by reference numeral 70. For the rest, identical reference symbols designate the same elements as before.

In the case of the sensor 70 from FIG. 3, the control unit is realized in two spatially separated parts 26a and 26b. In this case, the part 26a operates as a master channel 34, and part 26b operates as a slave channel 36. Part 26a is integrated into the sensor part 16, and part 26b is integrated into the sensor part 18. Upon initialization, the master channel 34 begins the optical communication between the sensor parts, i.e. the sensor part 16 with the master channel emits the first transmitted beam 22. In addition, a direct information exchange takes place between the two channels 34, 36, for which reason each channel 34, 36 has a communication component 72, 72'. In one exemplary embodiment, the communication between the communication components 72, 72' is effected by means of a bidirectional radio link. Alternatively, the bidirectional infrared or cable connection may be used. In a further advantageous exemplary embodiment, the optical communication link that exists between two opposite modules 20 by means of the modulated transmitted beams 22, 24 is also used for the communication between the channels 34, 36.

The sensor 70 is particularly advantageous for simple and cost-optimized variants. In advantageous exemplary embodiments, the processors and other components of the channels 34, 36 are in each case integrated in the base of the sensor parts 16, 18. In another exemplary embodiment, the channels 34, 36 are embodied as plug-in modules that are plugged together with the modules 20 by means of suitable plug connections in order to form the sensor parts 16, 18. Each channel 34, 36 evaluates the evaluation circuits 44, 46, 48 of the associated sensor part alone. The adjustment of the evaluation results is effected between the channels 34, 36 by means of the communication connection 72, 72'. Each channel 34, 36 generates an enable signal OSSD. The enable signals OSSD together form the redundant enable signal of the sensor 70. As in the case of the sensor 14 from FIG. 2, the channels 34, 36 can have inputs 38, 38' for start pushbuttons, emergency off pushbuttons, contactor monitoring (EDM), etc.

Overall, the exemplary embodiments of the novel sensor thus comprise a plurality of combined transmitting and receiving modules which form an optically monitored protective field by means of transmitted beams in opposite directions. The transmitting and receiving modules of the sensor parts situated opposite one another can communicate optically with one another by means of the transmitted beams. Moreover, the transmitting and receiving modules in each sensor part communicate with a superordinate control unit. Each module has an evaluation circuit which largely independently manages the connected transmitting and receiving elements and communicates with the other modules. Advantageously, two different bus connections are provided for the communication of the modules among one another and with the superordinate control unit, wherein a serial bus essentially transmits the switch-off signal, while a parallel data bus transmits diverse detail information items.

What is claimed is:

1. A light grid arrangement for safeguarding a hazardous area, comprising:
   a first and a second sensor part arranged at a spatial distance from one another, each sensor part having a plurality of transmitting elements for generating transmitted beams and a plurality of receiving elements for receiving the transmitted beams, such that a plurality of transmitted beams in opposite directions are formed between the sensor parts, and each sensor part having a plurality of evaluation circuits coupled to the receiving elements of the respective sensor part, with each evaluation circuit being designed to generate a switch-off signal in a manner dependent on the respectively coupled receiving elements, and
   a control unit coupled to the evaluation circuits, the control unit being configured to generate a redundant enable signal as a function of the switch-off signals,
   wherein a first evaluation circuit in each sensor part is coupled to a first number of the receiving elements,
   wherein a further evaluation circuit in each sensor part is coupled to a different number of the receiving elements,
   wherein the first and the further evaluation circuit in each sensor part are coupled to one another via a first line connection in order to form a series arrangement of evaluation circuits,
   wherein the series arrangement has an output coupled to the control unit in order to transmit the switch-off signals to the control unit in a manner dependent on all the receiving elements coupled to the series arrangement, and
   wherein the plurality of evaluation circuits in each sensor part are further connected to a common data bus connection, which is also connected to the control unit.

2. The light grid arrangement of claim 1, wherein the evaluation circuits in each sensor part are furthermore coupled to the transmitting elements of the respective sensor part in order to control the emission of the transmitted beams.

3. The light grid arrangement of claim 1, wherein each sensor part is designed to generate modulated transmitted beams, wherein the modulated transmitted beams form an optical communication link for synchronization between the sensor parts.

4. The light grid arrangement of claim 1, wherein each sensor part has an even number of transmitting elements and an even number of receiving elements, with the transmitting elements and the receiving elements being arranged alternately alongside one another, and wherein each receiving element faces exactly one transmitting element.

5. The light grid arrangement of claim 1, wherein the control unit has a first and a second channel, the first channel being arranged in the first sensor part, and the second channel being arranged in the second sensor part.

6. The light grid arrangement of claim 1, wherein the control unit is arranged separately from the first and the second sensor part.

7. The light grid arrangement of claim 1, wherein each sensor part is designed to generate the transmitted beams sequentially at least in sections.

8. The light grid arrangement of claim 1, wherein each sensor part is designed to acknowledge a received transmitted beam by means of a modulated transmitted beam generated in response to the received transmitted beam.

9. The light grid arrangement of claim 1, wherein the transmitting elements have a variable transmission power with a power minimum and a power maximum, with each sensor part being designed to alter the transmission power in steps between the power minimum and the power maximum.

* * * * *